(12) United States Patent
Chi et al.

(10) Patent No.: US 9,766,775 B2
(45) Date of Patent: Sep. 19, 2017

(54) MOBILE TERMINAL AND METHOD FOR CONTROLLING THE SAME

(71) Applicant: LG ELECTRONICS INC., Seoul (KR)

(72) Inventors: Jumin Chi, Seoul (KR); Juha Hyun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 94 days.

(21) Appl. No.: 14/881,947

(22) Filed: Oct. 13, 2015

(65) Prior Publication Data
US 2016/0202873 A1 Jul. 14, 2016

(30) Foreign Application Priority Data

Jan. 8, 2015 (KR) .......................... 10-2015-0002828

(51) Int. Cl.
| | |
|---|---|
| G06F 3/0481 | (2013.01) |
| G06F 3/01 | (2006.01) |
| G06F 3/00 | (2006.01) |
| G06F 3/0346 | (2013.01) |
| G06F 3/038 | (2013.01) |
| G06F 3/041 | (2006.01) |
| G06F 3/0484 | (2013.01) |
| G06F 3/14 | (2006.01) |

(Continued)

(52) U.S. Cl.
CPC .......... G06F 3/04815 (2013.01); G06F 3/005 (2013.01); G06F 3/017 (2013.01); G06F 3/038 (2013.01); G06F 3/0346 (2013.01); G06F 3/0416 (2013.01); G06F 3/0425 (2013.01); G06F 3/04845 (2013.01); G06F 3/1423 (2013.01); G09G 5/12 (2013.01); G03H 2227/02 (2013.01); G09G 2354/00 (2013.01); G09G 2370/06 (2013.01)

(58) Field of Classification Search
CPC .... G06F 3/04815; G06F 3/005; G06F 3/0346; G06F 3/038; G06F 3/0416; G09G 5/12
See application file for complete search history.

(56) References Cited

U.S. PATENT DOCUMENTS

2005/0286101 A1* 12/2005 Garner ...................... G03H 1/02
359/9
2008/0231926 A1* 9/2008 Klug .................. H04N 13/0425
348/E13.034

(Continued)

FOREIGN PATENT DOCUMENTS

EP 2 800 280 A1 11/2014

*Primary Examiner* — Kevin M Nguyen
(74) *Attorney, Agent, or Firm* — Birch, Stewart, Kolasch & Birch, LLP

(57) ABSTRACT

A mobile terminal including a touchscreen; a wireless communication unit configured to wirelessly communicate with an external watch terminal having a holography module disposed in a band of the watch terminal and being worn by a user; a sensing unit configured to sense a gesture of the user; and a controller configured to display a launch screen of a prescribed application on the touchscreen, receive a prescribed gesture sensed through the sensing unit, and control the wireless communication unit to transmit a control command to the external terminal to output a holographic image corresponding to the launch screen, in response to the received prescribed gesture.

20 Claims, 29 Drawing Sheets

(51) Int. Cl.
    *G09G 5/12*      (2006.01)
    *G06F 3/042*     (2006.01)

(56)            References Cited

U.S. PATENT DOCUMENTS

2011/0191707 A1   8/2011  Lee et al.
2013/0038528 A1*  2/2013  Fein ................. G06F 3/011
                                                       345/156
2014/0055352 A1*  2/2014  Davis ................ G06F 3/017
                                                       345/156
2014/0347295 A1   11/2014 Kim et al.

* cited by examiner

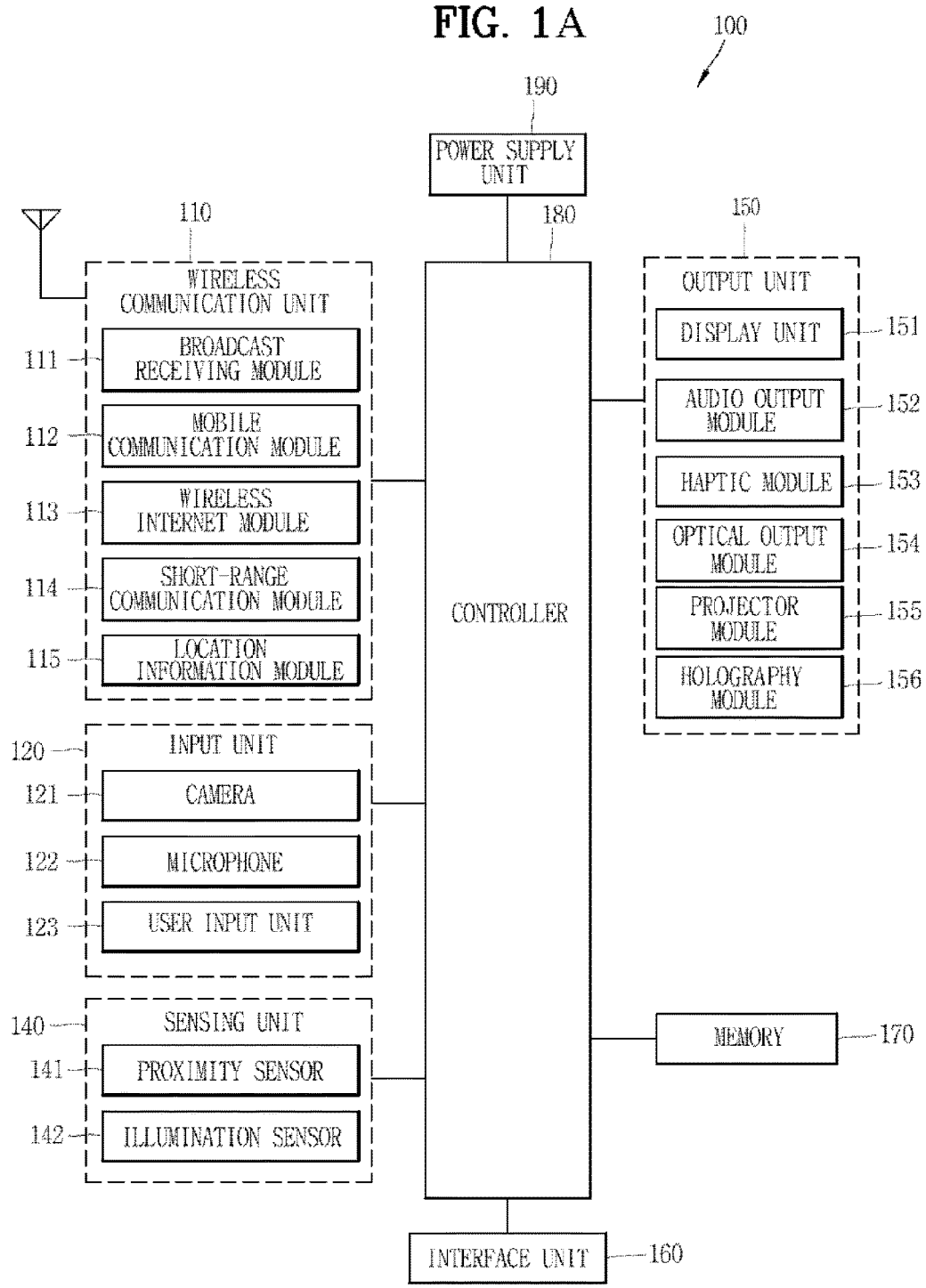

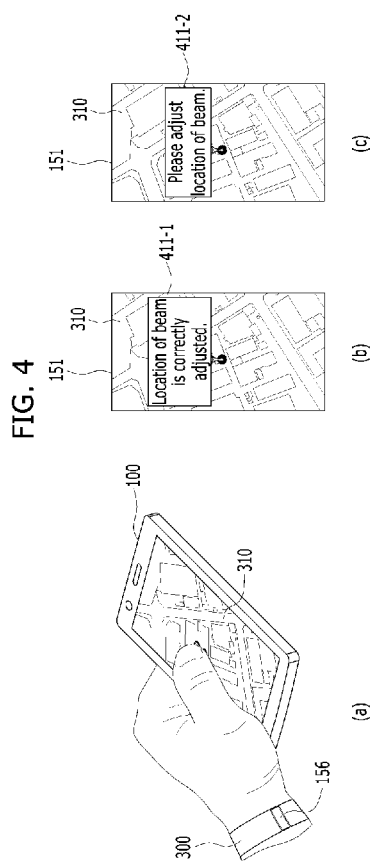

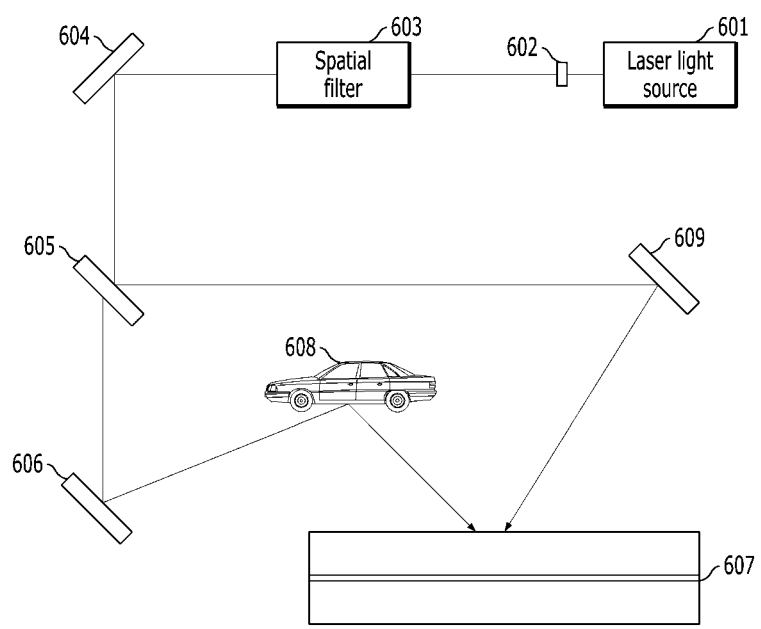

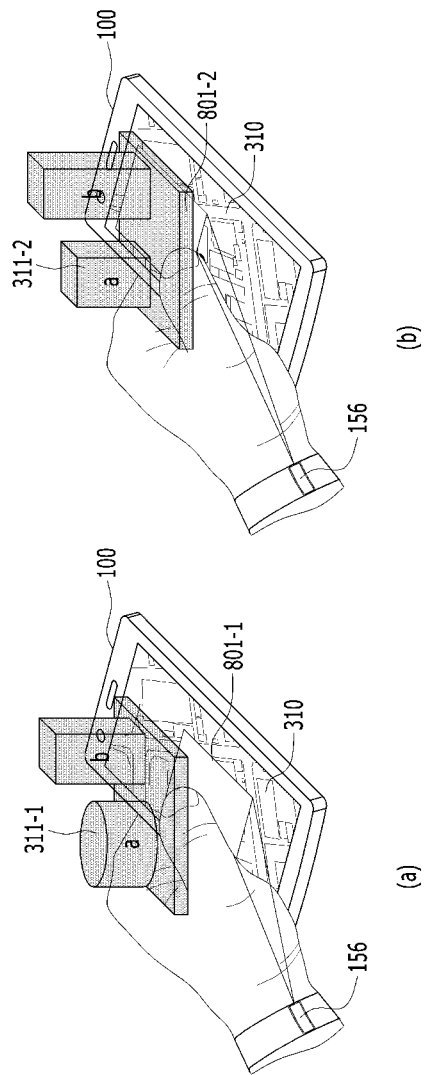

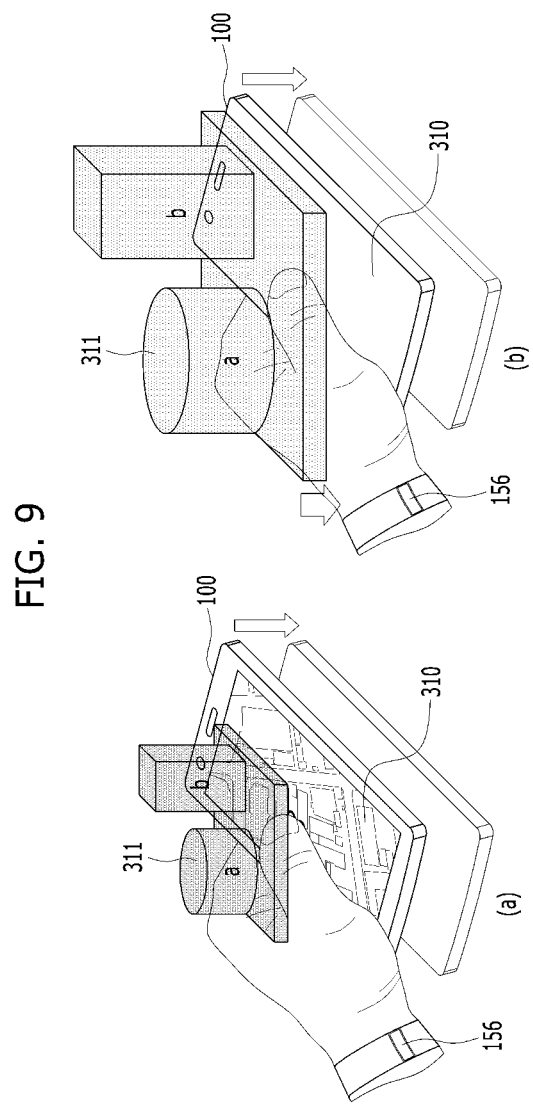

Occurrence/check of event
(a)

Playback/execution if rotating wrist
(b)

Rotation of wrist in opposite
direction of projector
(a)

Lowering of arm toward the ground
(b)

(a)   (b)

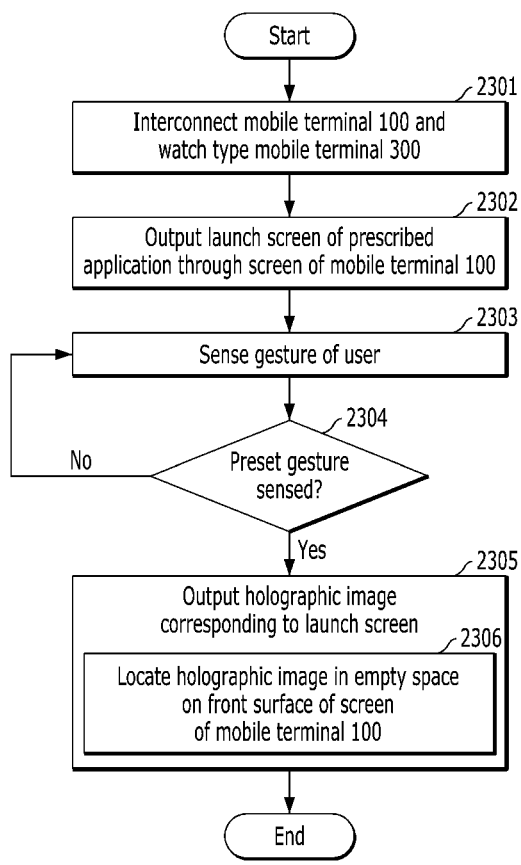

MOBILE TERMINAL AND METHOD FOR CONTROLLING THE SAME

Pursuant to 35 U.S.C. §119(a), this application claims the benefit of earlier filing date and right of priority to Korean Application No. 10-2015-0002828, filed on Jan. 8, 2015, the contents of which are hereby incorporated by reference herein in their entirety.

BACKGROUND OF THE INVENTION

Field of the Invention

The present invention relates to a mobile terminal, and more particularly, to a mobile terminal and method for controlling the same. Although the present invention is suitable for a wide scope of applications, it is particularly suitable for facilitating the use of a terminal in further consideration of user's convenience.

Discussion of the Related Art

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display.

Some mobile terminals include additional functionality which supports game playing, while other terminals are configured as multimedia players. More recently, mobile terminals have been configured to receive broadcast and multicast signals which permit viewing of content such as videos and television programs. Efforts are ongoing to support and increase the functionality of mobile terminals. Such efforts include software and hardware improvements, as well as changes and improvements in the structural components.

Recently, the application area of wearable devices has become broad. Many ongoing efforts are made to research and develop the various types of the wearable devices and there is a watch type mobile terminal as a representative form of the wearable device. The wearable device can be used by being interconnected to a different mobile terminal to improve user's convenience. For instance, a launch screen of a prescribed application output through the wearable device can be also output through the different mobile terminal interconnected to the wearable device.

However, such the interconnection of the launch screen is just duplication or extension of the output. Therefore, a controlling method for providing more efficient output through the interconnection of the launch screen is required.

SUMMARY OF THE INVENTION

Accordingly, an object of the present invention is to address the above-noted and other problems.

Another object of the present invention is to provide a mobile terminal for outputting a holographic image through an empty space over a front surface of a touchscreen of the mobile terminal and method for controlling the same.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to an embodiment of the present invention may include a sensing unit configured to sense a gesture of a user, a touchscreen, a wireless communication unit configured to transmit a control command for a holographic image to an external terminal having a holography module, and a controller controlling the touchscreen to output a launch screen of a prescribed application, the controller, if a prescribed gesture is sensed through the sensing unit, transmitting the control command to the external terminal to output the holographic image corresponding to the launch screen.

In another aspect of the present invention, a method of controlling a mobile terminal, which transmits a control command for a holographic image to an external terminal having a holography module, according to an embodiment of the present invention may include the steps of sensing a gesture of a user through a sensing unit, outputting a launch screen of a prescribed application through a touchscreen, and if a prescribed gesture is sensed through the sensing step, transmitting the control command to the external terminal to output the holographic image corresponding to the launch screen.

A mobile terminal and method for controlling the same according to an embodiment of the present invention provide the following effects and/or features.

According to at least one of embodiments of the present invention, it has an advantage of outputting a holographic image easily.

According to at least one of embodiments of the present invention, it has an advantage of outputting a holographic image synchronized with an image output through a touchscreen.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 1A is a block diagram of a mobile terminal in accordance with the present disclosure;

FIG. 4 is a diagram of a method for controlling direction of a beam projected from the holography module 156 according to one embodiment of the present invention;

FIGS. 6A to 6C are conceptual diagrams to describe transmission-type holography and FIGS. 7A to 7C are conceptual diagrams to describe reflection-type holography;

FIG. 8 is a diagram of a controlling method for adjusting an output position of a holographic image according to one embodiment of the present invention;

FIG. 9 is a diagram of a controlling method for controlling a size of an output holographic image according to one embodiment of the present invention;

FIG. 23 is a flowchart of a controlling method for outputting a holographic image according to one embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like. By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
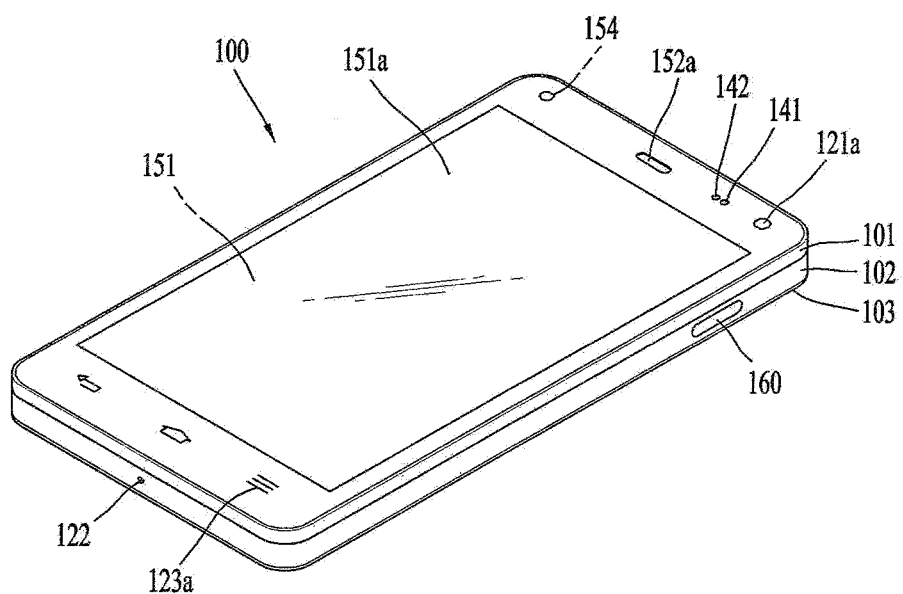
FIGS. 1B and 1C are conceptual views of one example of the mobile terminal, viewed from different directions.
Figure 1C:
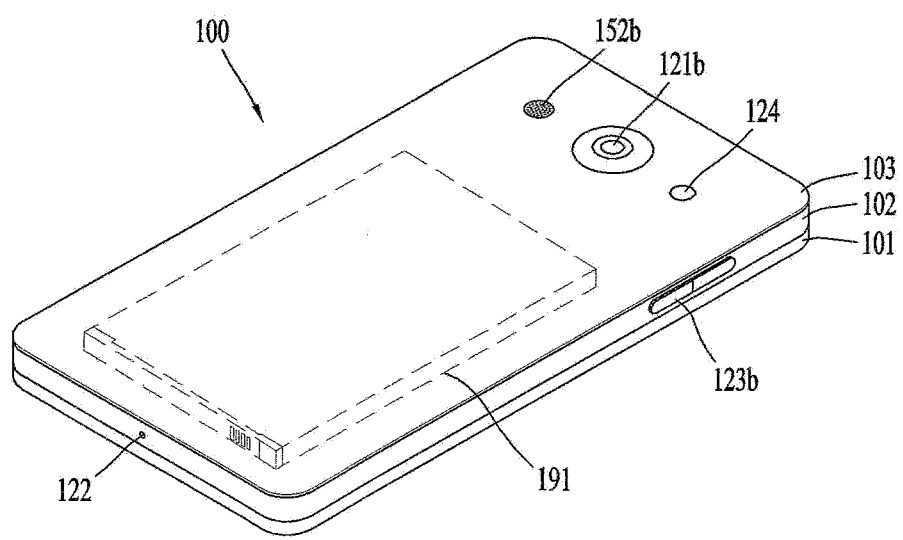

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, information and the like input or output through the above-mentioned components and/or runs application programs saved in the memory 170, thereby processing or providing a user with appropriate information and/or functions.

The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this instance, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example. FIG. 1A also illustrates a projector module 155 and a holography module 156, which will be described in more detail later.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the first audio output unit 152a, the second audio output unit 152b, the proximity sensor 141, the illumination sensor 142, the optical output unit 154, the first camera 121a, the second camera 121b, the first manipulating unit 123a, the second manipulating unit 123b, the microphone 122, the interface unit 160, and the like.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof. The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit.

When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output. The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds. The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, the mobile terminal can be extended to a wearable device, which is worn on the body of a user, by exceeding the level of a handheld device. Such a wearable device may include a smart watch, a smart glass, a head mounted display (HMD) and the like. Examples of the mobile terminal extended to the wearable device are explained in the following description.

The wearable device may be configured to exchange data (or be interconnected) with another mobile terminal 100. The short-range communication module 114 may sense (or recognize) the wearable device, which can be communicated with the mobile terminal 100, in the vicinity of the mobile terminal 100. Moreover, when the sensed wearable device is a device which is authenticated to communicate with the mobile terminal 100, the controller 180 can transmit at least part of data processed by the mobile terminal 100 to the wearable device via the short-range communication module 114. Hence, a user of the wearable device may use the data processed by the mobile terminal 100 on the wearable device. For example, when a call is received in the mobile terminal 100, the user can answer the call using the wearable device. Also, when a message is received in the mobile terminal 100, the user can check the received message using the wearable device.

Figure 2:
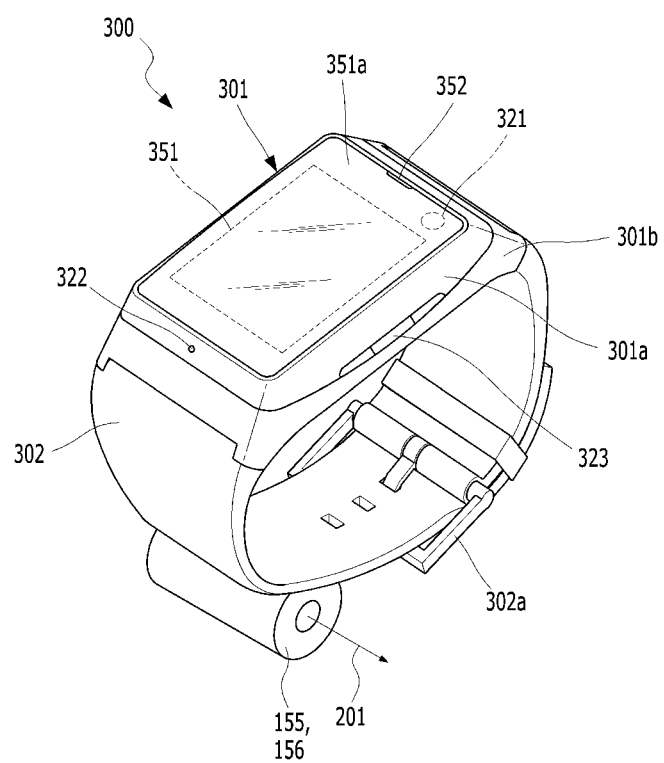
FIG. 2 is a perspective view of one example of a watch type mobile terminal 300 related to another embodiment of the present invention.

FIG. 2 is a perspective view of one example of a watch type mobile terminal 300 related to another embodiment of the present invention. Referring to FIG. 2, a watch type mobile terminal 300 may include a main body 301 with a display unit 351 and a band 302, which is configured to be wearable on the wrist, connected to the main body 301. In general, the watch type mobile terminal 300 may be configured to include features that are the same or similar to that of the mobile terminal 100 shown in FIGS. 1A to 1C.

The main body 301 may include a case forming the appearance of the terminal. As shown in the drawing, the case is formed using a first case 301a and a second case 301b defining an inner space for accommodating various electronic components, by which the present invention is non-limited. The mobile terminal 100 having a uni-body may be implemented in a manner that a single case is configured to define the inner space.

The watch type mobile terminal 300 is configured to perform wireless communication and an antenna for the wireless communication can be installed in the main body 301. The performance of the antenna may be improved using the case. For example, a case including a conductive material may be electrically connected to the antenna to extend a ground area or a radiation area.

The display unit 351 is located at the front side of the main body 301 in order to output information. In some cases, the display unit 351 includes a touch sensor so that the display unit 351 can be implemented as a touchscreen. As shown in the drawing, window 351a of the display unit 351 is positioned on the first case 301a to form a front surface of the terminal body together with the first case 301a.

The main body 301 may include an audio output module 352, a camera 321, a microphone 322, and a user input unit 323. When the display unit 351 is implemented as the touchscreen, it may works as the user input unit 323, whereby additional function keys may be omitted from the main body 301.

The band 302 is commonly worn on the user's wrist and may be made of a flexible material for facilitating wearing of the device. As one example, the band 302 may be made of leather, rubber, silicon, synthetic resin or the like. The band 302 may also be configured to be detachable from the main body 301. Accordingly, the band 302 may be replaceable with various types of bands according to a user's preference.

In some cases, the band 302 may be used for extending the performance of the antenna. For example, the band may include therein a ground extending portion electrically connected to the antenna to extend a ground area. The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Meanwhile, the watch type mobile terminal 300 according to one embodiment of the present invention may further include a projector module 155 and/or a holography module 156. The projector module 155 may perform an image projector function using the mobile terminal 100. The projector module 155 may display an image identical to or partially different from the image displayed on the display 151 on an external screen or wall according to a control signal of the controller 180.

For example, the projector module 155 may include a light source for generating light (e.g., laser) to output an image externally, an image producing device for producing an image to be externally output based on the light generated from the light source and a lens for enlarging the image to be externally output at a predetermined focus distance. Moreover, the projector module 155 may include a device for adjusting an image-projecting direction by mechanically moving the lens or the whole module.

The projector module 155 may be classified into a CRT (cathode ray tube) module, LCD (liquid crystal display)

module and a DLP (digital light processing) module in accordance with a display device type. Particularly, the DLP module may enables an image, which is generated by reflecting light generated from the light source on a DMD (digital micro-mirror device) chip, to be enlarged and projected. It may be advantageous in reducing a size of the projector module 151.

Preferably, as shown in FIG. 2, the projector module 155 can be provided with the band 302 of the mobile terminal 100 to project the image toward a prescribed direction 201. As mentioned in the foregoing description, the image-projecting direction may be adjusted. It is apparent that the projector module 155 may be disposed at any position of the mobile terminal 100, if necessary. The holography module 156 can include a holography storage unit, a holography output unit and, if necessary, a holography reflecting unit. The holography module 156 can be configured to output a holographic image on a preset space.

Hereinafter, a structure of the holography module 156 and a method of projecting a holographic image will be described in detail with reference to FIGS. 4 to 7. A location and an image-projection direction of the holography module 156 can be identical to those of the above-mentioned projector module 155. Details of the image-projection direction of the holography module 156 will be explained in the following description.

Embodiments related to controlling methods, which can be implemented in the above-mentioned mobile terminal, are described with reference to the accompanying drawings. It will be apparent to those skilled in the art that the present invention may be embodied in other specific forms without departing from the spirit and essential characteristics of the invention. According to an embodiment of the present invention, a controlling method for interconnecting launch screens between at least two mobile terminals is provided. The embodiments of the present invention are mainly focused on examples of interconnection with the launch screen of the watch type mobile terminal, by which the present invention is non-limited.

Figure 3:
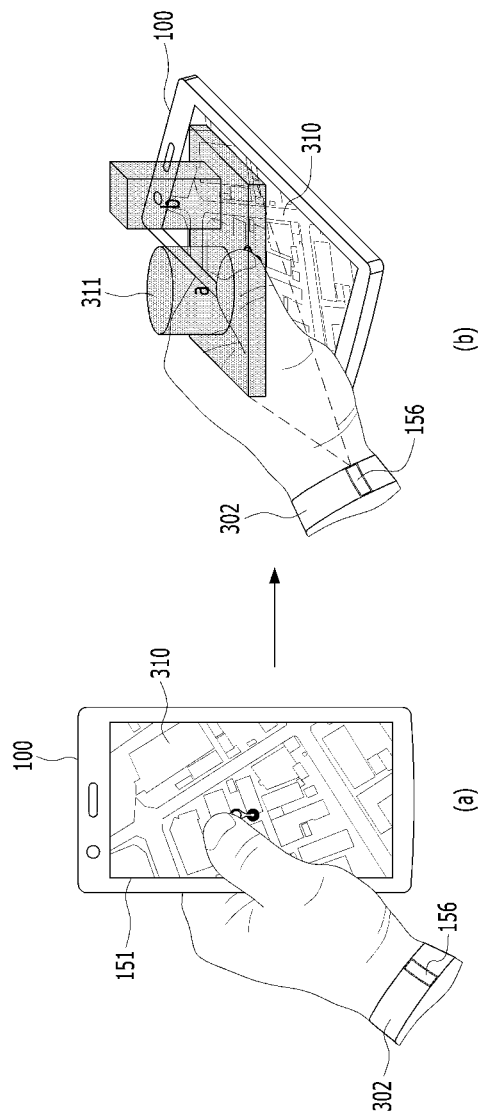
FIG. 3 is a conceptual diagram of a holographic image implemented through a holography module as shown in FIG. 2.

According to an embodiment of the present invention, as shown in FIG. 3, the holographic image 311 is projected onto an empty space over the front surface of the display unit 151 of the mobile terminal 100. In particular, the holographic image 311 is projected onto the empty space over the front surface of the display unit 151 of the mobile terminal 100 through the holography module 156 of the watch type mobile terminal 300 interconnected with the mobile terminal 100. In this instance, the holographic image 311 can be an image associated with the launch screen output through the display unit 151. For instance, if a map is output through the display unit 151, the holographic image 311 can correspond to a 3-dimensional image of the map. Details will be described with reference to FIG. 3.

Examples of the holographic image 311 related to the map are described in the embodiments of the present invention described with reference with the drawings, by which the present invention is non-limited. For instance, a holographic image for morphology of a patient may be used in the field of medicine or a 3-dimensional content may be used in the field of multimedia. Moreover, the present invention may be extended to a case that a 3-dimensional architectural model is output as a holographic image in the architectural field.

In particular, FIG. 3 is a conceptual diagram of a holographic image 301 implemented through a holography module 156 as shown in FIG. 2. In the embodiments described with reference the following drawings including FIG. 3, assume that the mobile terminal 100 and the watch type mobile terminal 300 are interconnected with each other. Referring to FIG. 3 (*a*), the controller 180 of the mobile terminal 100 outputs a launch screen 310 of a map application through the display unit 151. The holography module 156 is provided with the band 302 of the watch type mobile terminal 300 and projects an image toward the hand of a user. The holography module 156 can output the holographic image 311 through an empty space over the front surface of the display unit 151 together with visual information output through the display unit 151 of the mobile terminal 100.

The holographic image 311, which can be implemented through the holography module 156, may include a 3-dimensional (3D) stereoscopic image. Stereoscopic imaging, which provides different images to both eyes respectively, uses a principle that the human being feels stereoscopic when viewing an object with two eyes. In particular, the two eyes of the human being view different monoscopic images when viewing the same object due to a distance therebetween. The different monoscopic images are transferred to the brain through the retina and unified (combined) in the brain such that depth and reality of a stereoscopic image can be felt. Therefore, although slightly different in persons, binocular disparity due to the distance between both eyes brings about stereoscopic feeling. The stereoscopic imaging is a method of displaying an image using the binocular disparity.

If a launch screen 310 is being output through the display unit 151, while a prescribe condition is met, the controller 180 can control the holography module 156 to automatically output the holographic image 311. As the prescribed condition, sensing on whether the display unit 151 of the mobile terminal 100 faces the sky as shown in FIG. 3 (*b*) is provided in an embodiment of the present invention. In particular, if the front surface of the display unit 151 is rotated to face the sky, controller 180 can control the holographic image 311 to be output through the interconnected watch type mobile terminal 300.

In this instance, as mentioned in the foregoing description, the holography module 156 disposed at the band 302 of the watch type mobile terminal 300 can output the holographic image 311 through the empty space over the front surface of the display unit 151. Meanwhile, a direction of the beam projected from the holography module 156 disposed at the band 302 may be incorrect. For this case, a controlling method for adjusting the direction of the beam correctly is described with reference to FIG. 4.

In particular, FIG. 4 is a diagram of a method for controlling direction of a beam projected from the holography module 156 according to one embodiment of the present invention. It is assumed in FIG. 4 (*a*) that the beam projected from the holography module 156 does not face the empty space over the front surface of the display unit 151. If the direction of the beam projected from the holography module 156 is not correct as the above assumption, the direction of the beam can be adjusted by the controller 180 or a user.

In particular, the controller 180 can sense a location of the display unit 151 and then automatically adjust the projecting direction of the holography module 156 to match the projecting direction with the sensed location of the display unit 151. In this instance, as shown in FIG. 4 (*b*), a popup window 411-1 for indicating that the location of the beam is automatically adjusted can be output through the display unit 151.

Further, if the direction of the beam is unable to be automatically adjusted, the controller 180 can output a popup window 411-2 for requesting adjustment of the location of the beam as shown in FIG. 4 (*c*). In this instance, an indicator for rotating the watch type mobile terminal 300 on the user's wrist or a vibration output having a direction may be provided together with the popup window 411-2. In this instance, a posture is determined based on a gyroscope sensor included in each of the mobile terminals 100 and the watch type mobile terminal 300 and an indicator or a vibration output appropriate for the determined posture may be provided.

Hereinafter, description will be given in detail of a method of creating the holographic image 311, which may be applied to the embodiments of the present invention, and a structure for implementing the method. An image output through the display unit 151 merely records only a distribution of bright and dark surfaces of an object, whereas the holographic image 311 can be understood as an image which simultaneously accumulates and reproduces all of information, i.e., amplitude and phase, which light as wave contains.

Figure 5A:
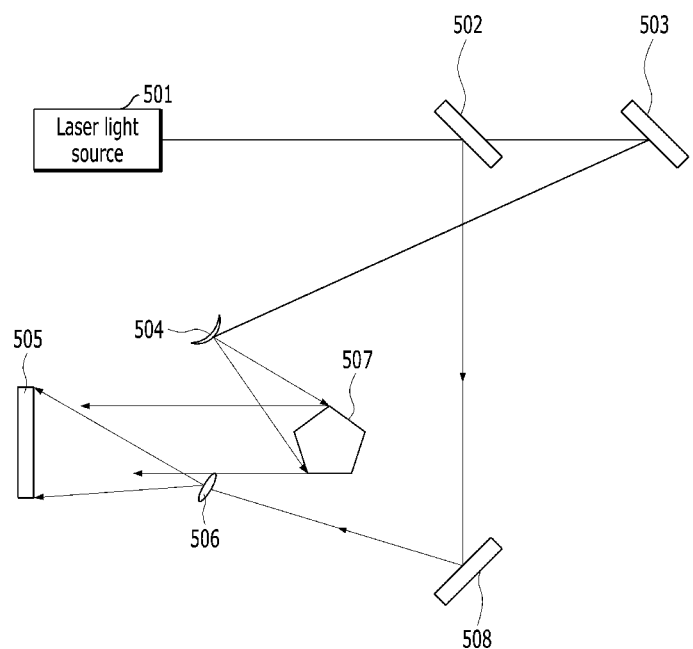
FIGS. 5A and 5B are conceptual diagrams to describe the principle of holography.
Figure 5B:
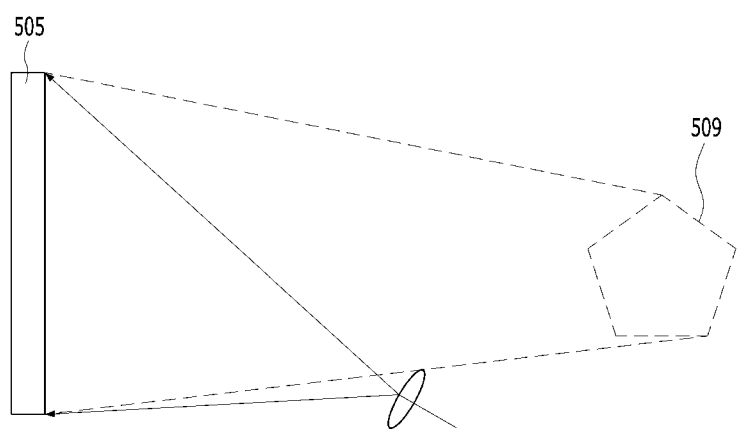

FIGS. 5A and 5B are conceptual diagrams to describe the principle of holography. Referring to FIG. 5A, coherent beams (light) emitted from a laser light source 501 may be split into two parts through a splitter 502. One of the two parts of beams may illuminate an object 507, and beams that are scattered and reflected on a surface of the object 507 can reach a holographic photosensitive material 505. Hereinafter, the beam is referred to as an object wave. Mirrors 503 and 504 may be used to turn (change) a path of the light.

The other beams may be turned to a path toward a mirror 508, diffused through a lens 506, and directly reach an entire surface of the holographic photosensitive material 505. Hereinafter, this beam is referred to as reference wave. The object wave and the reference wave bring about interference on the holographic photosensitive material 505, thereby giving rise to very delicate, complicated interference fringes, which are 500 to 1500 in number per 1 mm. A holographic storage medium for recording such interference fringes is referred to as a hologram.

Afterwards, as shown in FIG. 5B, if the beams such as the reference waves, i.e., reconstruction waves are projected to the holographic photosensitive material 505, the interference fringes can serve as diffraction grating, such that the beams can be diffracted at different positions from an incident direction of the reference waves. The diffracted beams may be converged so as to form the same as the beams initially reflected from the object, thereby projecting a holographic image 509. In particular, the initial object waves may be reconstructed through the hologram so as to realize the holographic image 509.

In this instance, if viewed from an inside of a reconstructed wave front, the original object is viewed but it seems like the object is located inside. In addition, if a view point is moved, a position where the object is viewed is also changed. It feels like to view a stereoscopic image. Moreover, since the wave front of the original object is reconstructed, it may cause interference against a wave front which comes from a very slightly deformed object.

Figure 6B:
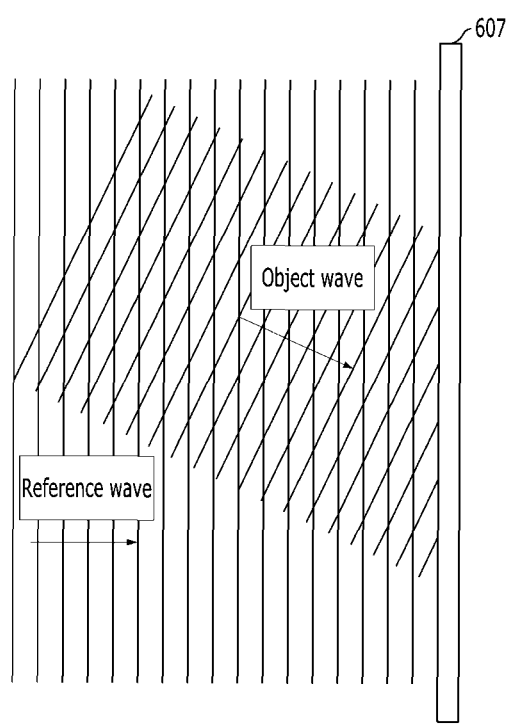
Figure 6C:
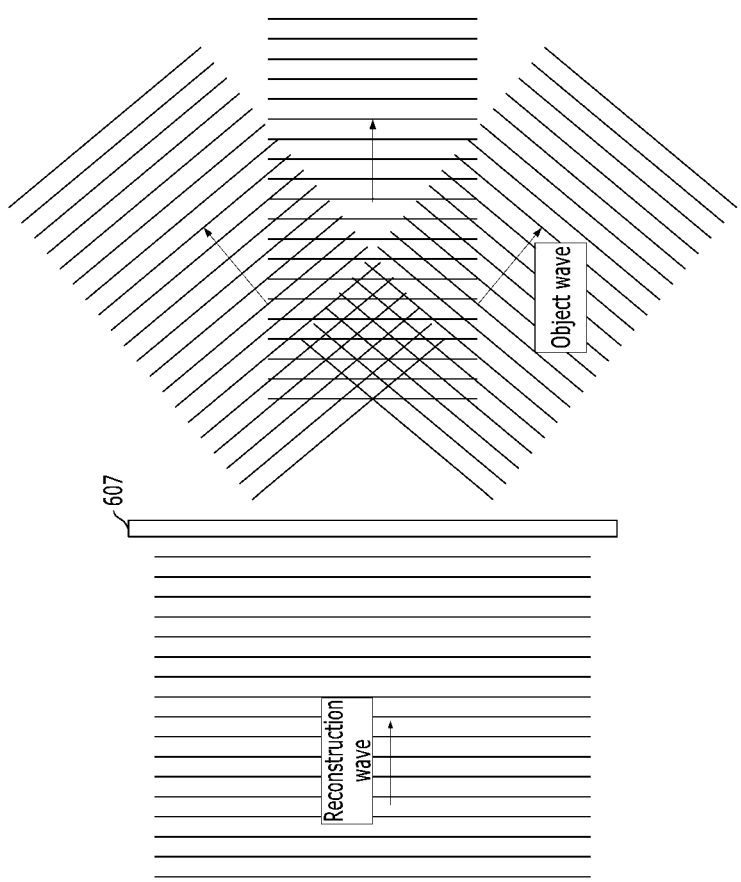
Figure 7A:
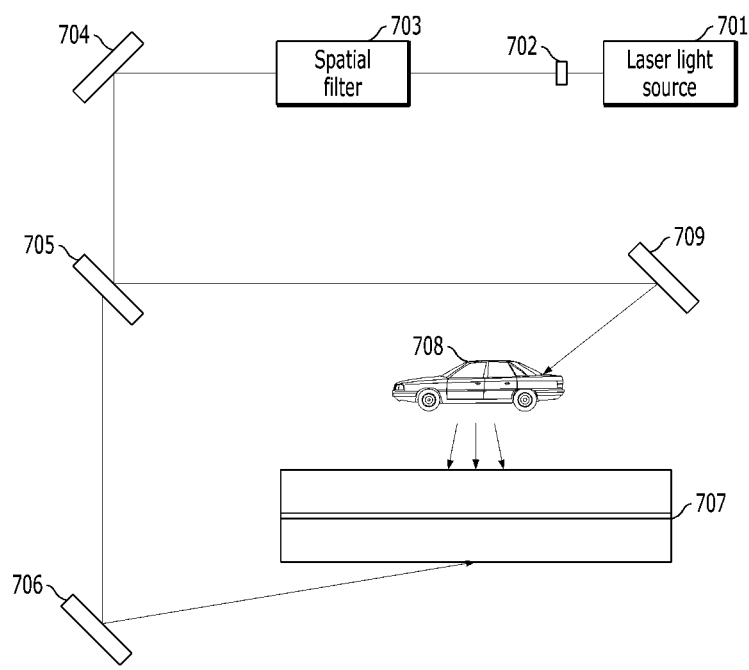
Figure 7B:
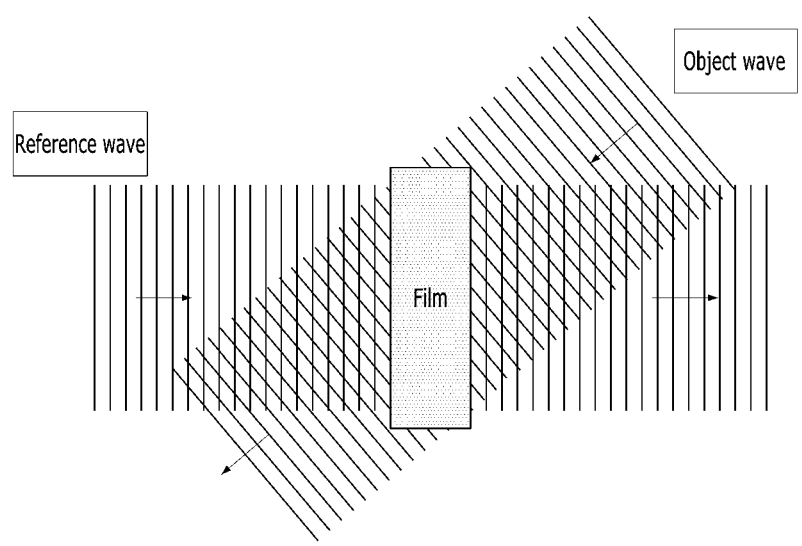
Figure 7C:
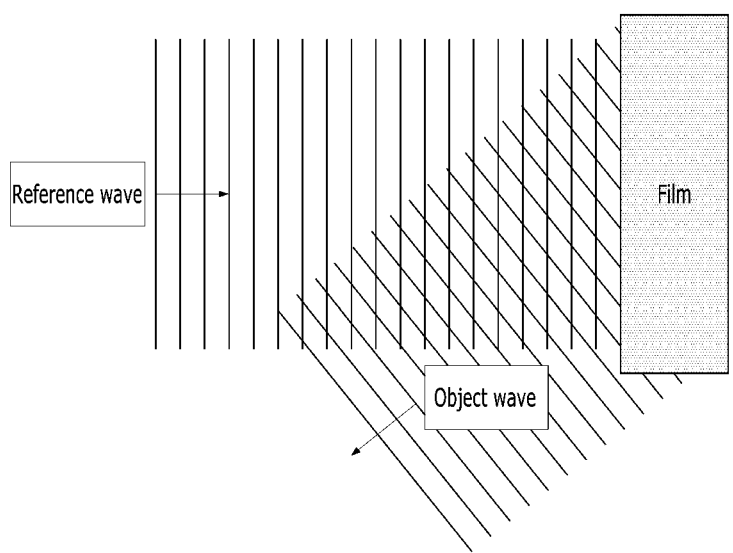

Methods of creating the holographic image 509 may be classified into transmission-type holography and reflection-type holography. In particular, FIGS. 6A to 6C are conceptual diagrams to describe transmission-type holography and FIGS. 7A to 7C are conceptual diagrams to describe reflection-type holography.

Transmission-type holography is a technique of observing an image, which is made by light that is illuminated from a rear side of a hologram and transmitted through the hologram, in front of the hologram. The transmission type holography has characteristics that object waves and reference waves are exposed to a holographic photosensitive material in the same direction in producing a holographic image and that the generated holographic image is vivid and bright in color.

Referring to FIG. 6A, beams emitted from a laser light source 601 may be transmitted through a spatial filter 602 and then spread as smooth spherical waves. The spherical waves can be split into two parts of waves through a beam splitter 605. One of the two split spherical waves may be illuminated on an object 608 to generate object waves and the other may be illuminated on a holographic photosensitive material 607 so as to generate reference waves. The object waves illuminated on the object 608 may also be illuminated on the holographic photosensitive material 607. Mirrors 604, 606 and 609 may be used for turning/changing paths of the beams.

In this instance, the object waves and the reference waves which are illuminated on the holographic photosensitive material 607 may interfere with each other to generate interference fringes. The interference fringes may then be recorded in the holographic photosensitive material 607. In particular, as illustrated in FIG. 6B, the object waves and the reference waves may be projected on the same surface of the holographic photosensitive material 607 together and then generate the interference fringes.

Subsequently, referring to FIG. 6C, if reconstruction waves which are the same as the reference waves are projected onto the holographic photosensitive material 607, the object waves may be transmitted in an opposite direction to the surface on which the object waves and the reference waves have been incident, thereby producing a holographic image.

Next, reflection-type holography is a technique of observing an image, which is made by light that is illuminated to the front of a hologram and reflected on the hologram, in front of the hologram. The reflection-type holography may be manufactured such that object waves and reference waves are incident onto a holographic photosensitive material in opposite directions to each other. A holographic image produced according to the reflection-type holography technique exhibits a characteristic of providing excellent 3D effect.

Referring to FIG. 7A, as similar to FIG. 6A, beams emitted from a laser light source 701 may be transmitted through a spatial filter 702 and spread as smooth spherical waves. The spherical waves may be split into two parts of waves through a beam splitter 705. One of the two split spherical waves may be illuminated on an object 708 to generate object waves and the other may be illuminated on a holographic photosensitive material (film) 707 in order to generate reference waves. Mirrors 704, 706 and 709 may be used for turning paths of the beams. In this instance, unlike FIG. 6A, the reference waves and the object waves may be illuminated on the holographic photosensitive material 707 at opposite positions to each other.

In particular, referring to FIG. 7B, the reference waves may be projected through a left surface of the holographic photosensitive material 707 and the object waves may be projected through a right upper surface of the holographic photosensitive material 707. Afterwards, as shown in FIG. 7C, if reconstruction waves which are the same as the reference waves are projected through the holographic photosensitive material 707, the object waves may be transmitted in an opposite direction, thereby producing a holographic image.

In the present specification, the holographic photosensitive material 307 and 707 is expressed as a holographic storage medium which is included in a holographic storage unit and another component which is capable of producing a holographic image by projecting light onto the holographic photosensitive material 307 and 707 may be expressed as a holographic output unit.

For clarity, this specification illustrates that the holographic storage unit and the holographic output unit are all included in the holography module 156. However, it is just exemplary and they may be included in the mobile terminal 100 as separate components. Meanwhile, in relation to one embodiment of the present invention, a holographic image may be displayed according to a set holographic pattern. The holographic pattern means that a holographic image projected through the holography module 156 is changed into a preset pattern according to the elapse of time so as to be provided to a user.

The holographic pattern may be variously set according to the following methods. First, the holographic pattern may be set by changing a distance difference between the holographic output unit and a holographic image according to the elapse of time. With the configuration, the holographic image projected through the holography module 156 can be moved up and down, which may allow for setting a predetermined holographic pattern.

Also, the holographic pattern may be set by changing a shape of the holographic image projected through the holography module 156 according to the elapse of time. For example, the controller 180 can control the holographic image projected through the holography module 156 to have a circular shape initially and then control the circular shape to change into a rectangular shape according to the elapse of time.

Moreover, the holographic pattern may be set by applying a method of moving to left or right or rotating the holographic image projected through the holography module 156. In particular, a holographic pattern may be set by moving a projected holographic image to left or right, rotating the projected holographic image or rotating the projected holographic image with moving it to left or right according to the elapse of time, while maintaining a distance difference between the holography module 156 and the holographic image.

Furthermore, the holographic pattern may be set by changing a color or size of the projected holographic image or controlling the holographic image to be flickered according to the elapse of time. In addition, the holographic pattern may also be set by projection brightness, reproduction frequency, lighting, vibration feedback, sound insertion, image insertion, repetitive projection and the like.

The foregoing description is given on the assumption that the holographic pattern is set by individual factors but the holographic pattern may also be set by a plurality of factors. For example, the holographic pattern may be set by moving to left or right or rotating the projected holographic image while changing a distance difference between the holography module 156 and the holographic image according to the elapse of time.

Moreover, the foregoing description is given on the assumption that the holographic pattern is set with respect to the entire holographic image but it is just exemplary. The holographic pattern may also be applicable only to a partial area of the holographic image Next, FIG. 8 is a diagram of a controlling method for adjusting an output position of a holographic image according to one embodiment of the present invention. According the embodiment of the present invention described with reference to FIG. 8, a holographic image 311-1 is output in accordance with a location at which a beam projected through the holography module 156 arrives. It is assumed in FIG. 8 that a holographic image, which corresponds to not an entire launch screen output through the display unit 151 of the mobile terminal 100 but a part of the launch screen, is output.

Referring to FIG. 8 (a), the holography module 156 projects a beam onto a first region 801-1 of the display unit 151 and outputs a first holographic image 311-1. When a user adjusts a projecting direction of the beam using the wrist, the beam may move from the first region 801-1 to a second region 801-2. Thus, the holography module 156 can output a second holographic image 311-2 corresponding to the second region 801-2 (FIG. 8 (b)). In particular, similar to a cursor, the user can control the holographic image to be output by moving the location at which the beam is arrived.

FIG. 9 is a diagram of a controlling method for controlling a size of an output holographic image according to one embodiment of the present invention. Referring to FIG. 9 (a), the holography module 156 outputs a first size of the holographic image 311. The holographic image 311 can be an image corresponding to the launch screen 310 of the application as mentioned in the foregoing description.

If a command for changing a size of the holographic image 311 is received, the holography module 156 can change the size of the holographic image 311 from the first size into a second size and then output the second size of the holographic image (FIG. 9 (b)).

According to the embodiment of the present invention described with reference to FIG. 9, a gesture of moving the mobile terminal down as the command for changing the size of the holographic image is proposed. If the controller 180 determines based on a sensing result obtained through the sensing unit 140 that the mobile terminal 100 moves down by a predetermined distance or more, the controller can adjust the size of the holographic image 311 output through the holography module 156 from the first size to the second size.

Figure 10:
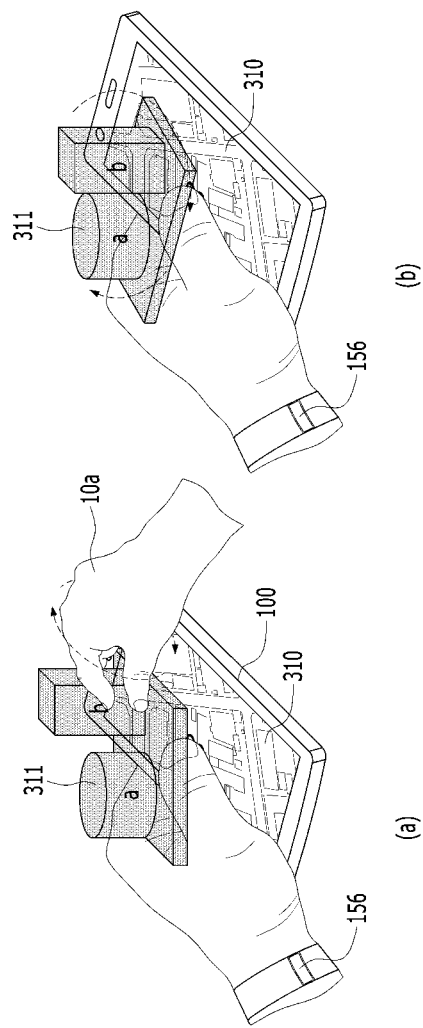
FIG. 10 is a diagram of a controlling method for rotating a holographic image 311 according to one embodiment of the present invention.

Hereinafter, a controlling method for rotating the holographic image 311 is described with reference to FIG. 10. In particular, FIG. 10 is a diagram of a controlling method for rotating a holographic image 311 according to one embodiment of the present invention. Referring to FIG. 10 (a), the holography module 156 outputs the holographic image 311. The holographic image 311 can be an image corresponding to the launch screen 310 of the application as mentioned in the foregoing description.

If a command for rotating the holographic image 311 is received, the controller 180 controls the holographic image 311 output through the holography module 156 to be rotated (FIG. 10 (b)). According to the embodiment of the present invention described with reference to FIG. 10, as the command for the rotation, a gesture 10a of pinching the output 3D holographic image 311 with two fingers and rotating the two fingers is provided, by which the present invention is non-limited.

Meanwhile, the use of the proximity sensor and the camera 121 is provided in an embodiment of the present invention so as to sense the gesture made in an empty space. If the controller 180 senses through the proximity sensor that the user's hand gets close to the empty space over the front surface of the display unit 151, the controller 180 can activate the camera 121. Also, the controller 180 can analyze a shape of the hand through the activated camera 121 and then sense the gesture through the analyzed hand shape. In this instance, the activation of the camera 121 may include analysis of an image received through the pre-activated camera 121 as well as activation of the camera module.

In addition, the use of a proximity gesture sensing module is provided in another embodiment of the present invention in order to sense the gesture made in the empty space. Similar to the activation of the camera 121 as mentioned in the foregoing description, the proximity gesture sensing module may be activated if the controller 180 senses that the user's hand gets close.

According to an embodiment of the present invention, the gesture made on the holographic image 311 output through the empty space may be sensed through the following method. In the embodiment of the present invention described with reference to FIG. 10, the output of the holographic image 311 is controlled based on the user's gesture which is input on the holographic image 311 output through the empty space. According to the following drawings, it is proposed that the holographic image 311 is controlled based on a touch input on the display unit 151.

Figure 11:
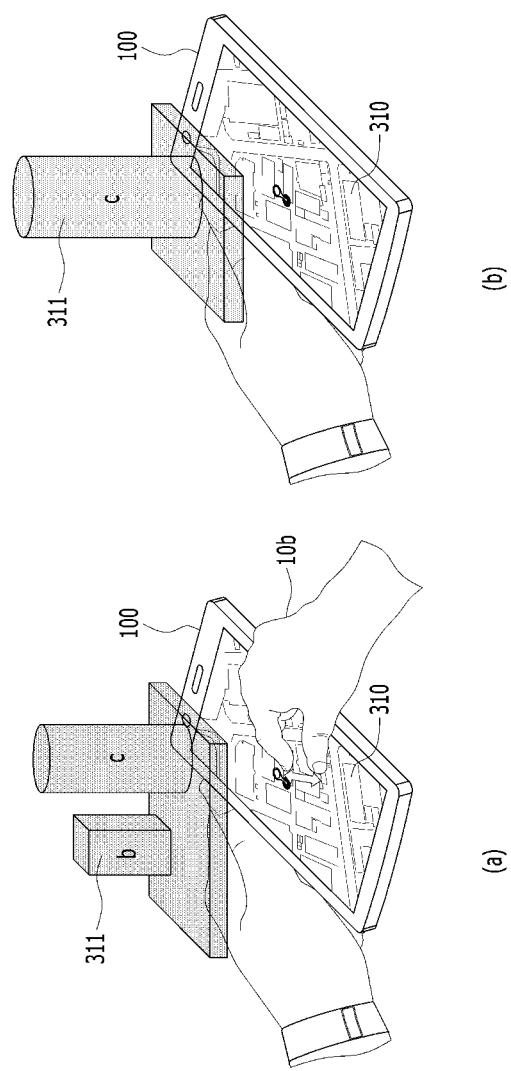
FIG. 11 is a diagram of a controlling method for controlling a holographic image 311 based on a touch input on a display unit according to one embodiment of the present invention.

Next, FIG. 11 is a diagram of a controlling method for controlling a holographic image 311 based on a touch input on a display unit 151 according to one embodiment of the present invention. Referring to FIG. 11 (a), the holography module 156 outputs the holographic image 311. The holographic image 311 can be an image corresponding to the launch screen 310 of the application as mentioned in the foregoing description.

If a command for enlarging the application launch screen 310 is received through the display unit 151, the controller 180 can control the application launch screen 310 to be enlarged. In addition, the controller 180 can control a size of the holographic image 311 corresponding to the application launch screen 310 as shown in FIG. 11 (b).

In particular, the size of the holographic image 311 can be changed in response to the enlargement of the application launch screen 310. Meanwhile, a controlling method for more efficiently controlling the holographic image 311 is provided in an embodiment of the present invention. Such an embodiment will be described with reference to FIGS. 12 to 14.

Figure 12:
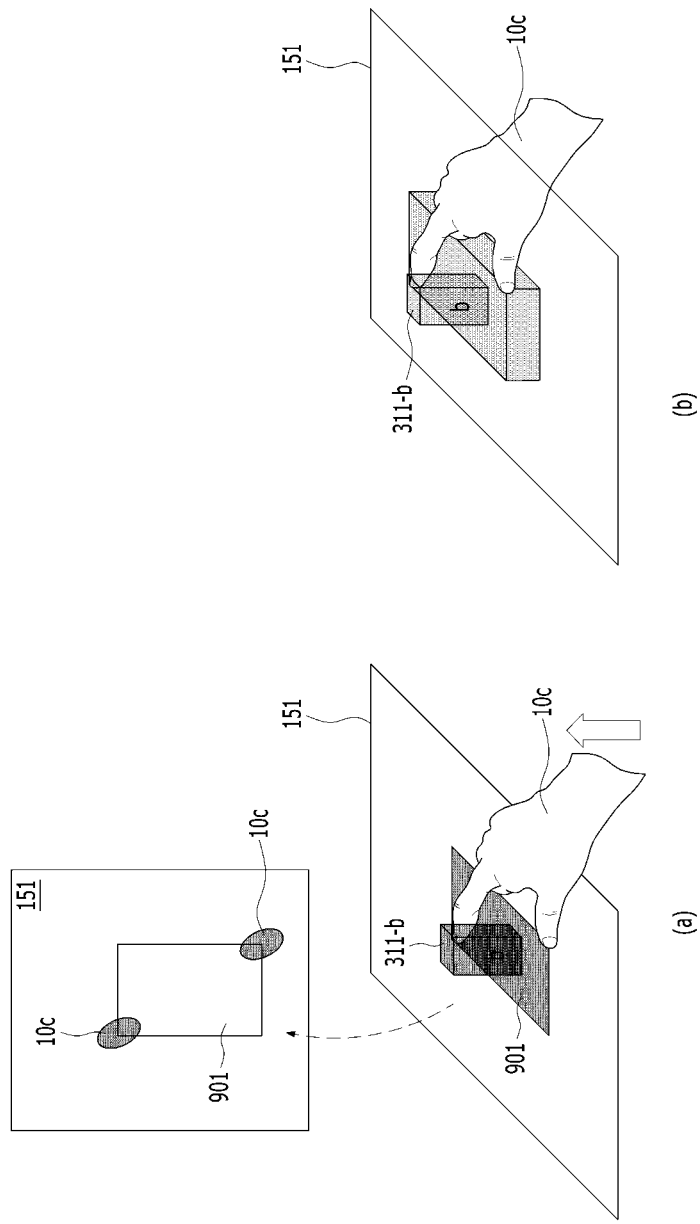
FIG. 12 is a diagram of a controlling method for outputting a sub-board for controlling a holographic image according to one embodiment of the present invention.

FIG. 12 is a diagram of a controlling method for outputting a sub-board for controlling a holographic image 311 according to one embodiment of the present invention. According to an embodiment of the present invention, it is assumed that a holographic image includes at least one object. In addition, the controller 180 controls additional information to be further output if receiving an object selection command of a user.

For instance, according to an embodiment of the present invention, a 3-dimensional map with respect to a displayed map region is output as a holographic image together with a launch screen of a map application. The 3D map may include a 3D image with respect to terrains or building shapes in the map region. In this instance, specific terrains or buildings are distinguished as separate objects respectively and additional information on each of the separate objects may be further output.

Referring to FIGS. 12 (a) and (b), a holography image 311-b for a specific object is output. In this example, the specific object is assumed to be a specific building. While watching the holographic image 311-b, a user may want to obtain information (e.g., the number of floors, an area, information on each floor, etc.) on the corresponding building. Thus, according to an embodiment of the present invention, it is proposed that a sub-board 901 is further output as the holographic image 311-b and that the information is output based on a control operation for the sub-board 901.

Referring to FIG. 12 (a), if a command for calling the sub-board 901 is received, the holography module 156 can output the sub-board 901 to the holographic image 311. The sub-board 901, which is a virtual 3D object represented as a holographic image, may be used as an auxiliary method for outputting information of an object according to an embodiment of the present invention.

In the example shown in FIGS. 12 (a) and (b), the command for calling the sub-board 901 corresponds to a gesture of touching two points 10c on the display unit 151 and lifting in the air, by which the present invention is non-limited. The sub-board 901 may be a rectangular shape having the two touched points as vertices. In this instance, the display unit 151 may be a touchscreen. Hereinafter, a method of displaying information related to a corresponding object using the output sub-board 901 will be described in detail with reference to FIGS. 13 and 14.

Figure 13:
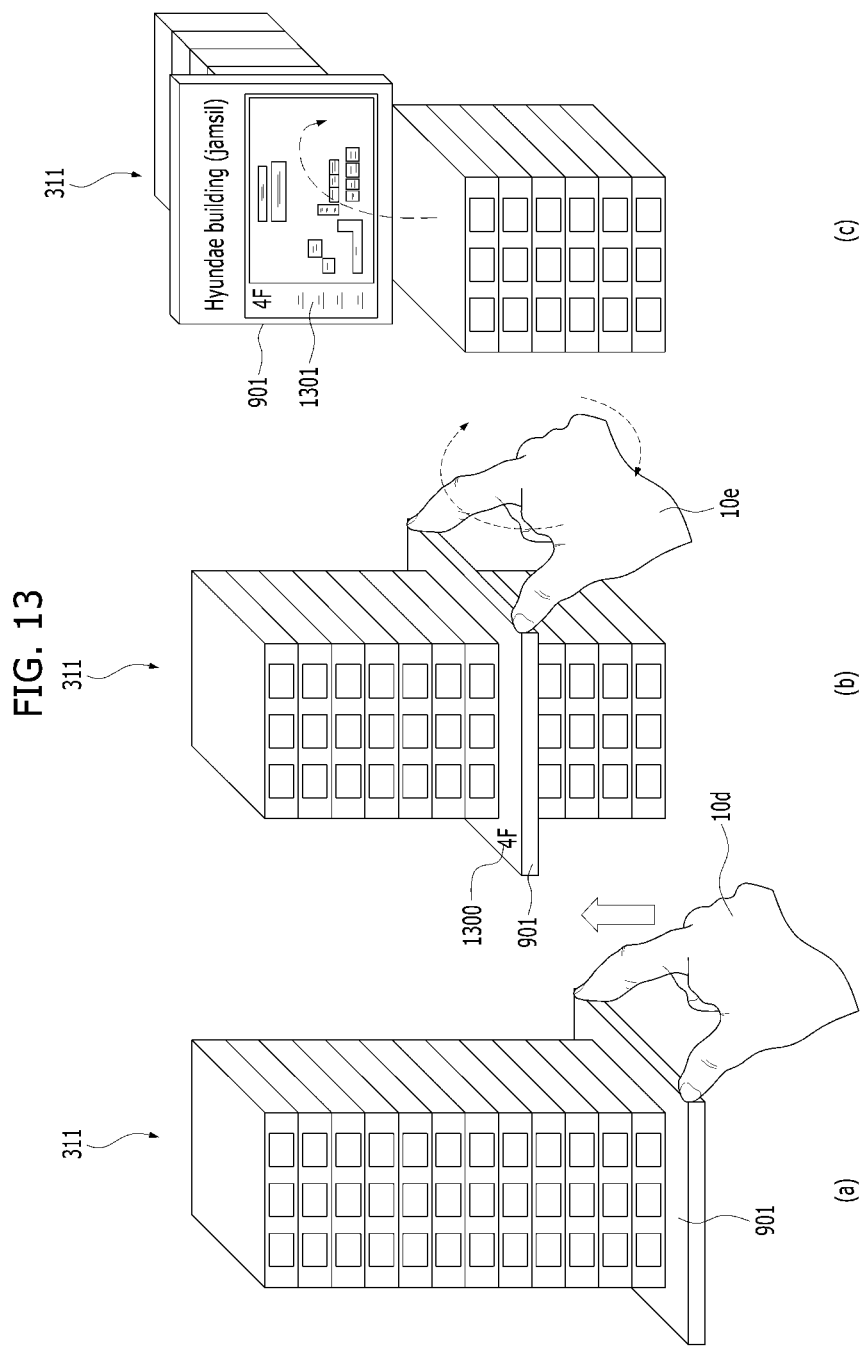
FIG. 13 is a diagram of a controlling method for outputting prescribed information using a sub-board according to one embodiment of the present invention.

FIG. 13 is a diagram of a controlling method for outputting prescribed information using a sub-board according to one embodiment of the present invention In case of information on a building, information may be sorted according to a floor. In an embodiment of the present invention, information on each floor is displayed using the sub-board 901.

Referring to FIG. 13 (a), a 3D object for a prescribed building is output using a holographic image. In addition, the sub-board 901 mentioned with reference to FIG. 12 is output together with the 3D object for the prescribed building. If a gesture 10d (i.e., a gesture of holding the virtual sub-board 901 with the hand and raising the hand up) of moving the sub-board 901 toward the top portion of the building is sensed, the controller 180 can adjust a location of the sub-board 901 and then output the sub-board 901 by controlling the holography module 156 (FIG. 13 (b)).

The controller 180 can further display the floor number 1300, at which the sub-board 901 is positioned, of the building. If information request command 10e is received, the controller 180 can output information 1301 on the floor, at which the sub-board 901 is positioned, of the building (FIG. 13 (c)). In this instance, the information request command 10e may correspond to a gesture of turning over the sub-board 901 like uncovering as shown in FIG. 13 (b). In response to the information request command 10e, the controller 180 can turn over the sub-board 901 and then display the floor information 1301 on the bottom part of the turned over sub-board 901.

Hereinafter, details on information output to the bottom part of the sub-board 901 will be described with reference to FIG. 14. In particular, FIG. 14 is a diagram of an example of information on each floor of a building that can be output according to one embodiment of the present invention.

Figure 14:
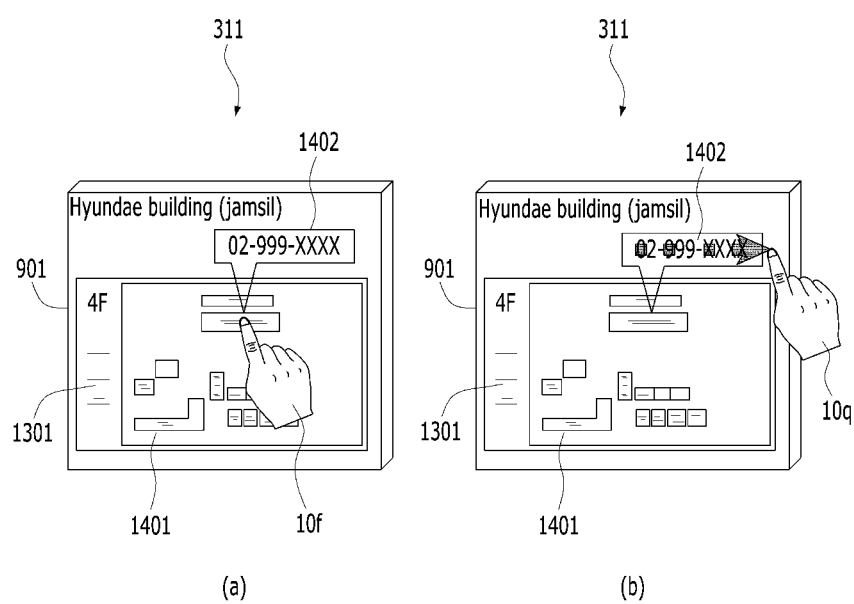
FIG. 14 is a diagram of an example of information on each floor of a building that can be output according to one embodiment of the present invention.

Referring to FIG. 14 (a), the floor information 1301 is output to the bottom part of the sub-board 901 as mentioned in the foregoing description with reference to FIG. 13. The floor information 1301 may include an interior map 1401 for the corresponding floor. The interior map 1401 may include information on stores located on the corresponding floor.

If a store is selected from stores included in the interior map 1401 (10f), the controller 180 can further output store information 1402 on the selected store. In the example shown in FIG. 14 (a), the store information 1402 includes a phone number of the store. If a predetermined touch gesture 10g is received on the output phone number, the controller 180 can transmit a call signal for calling the corresponding phone number automatically (FIG. 14 (b)).

Figure 15:
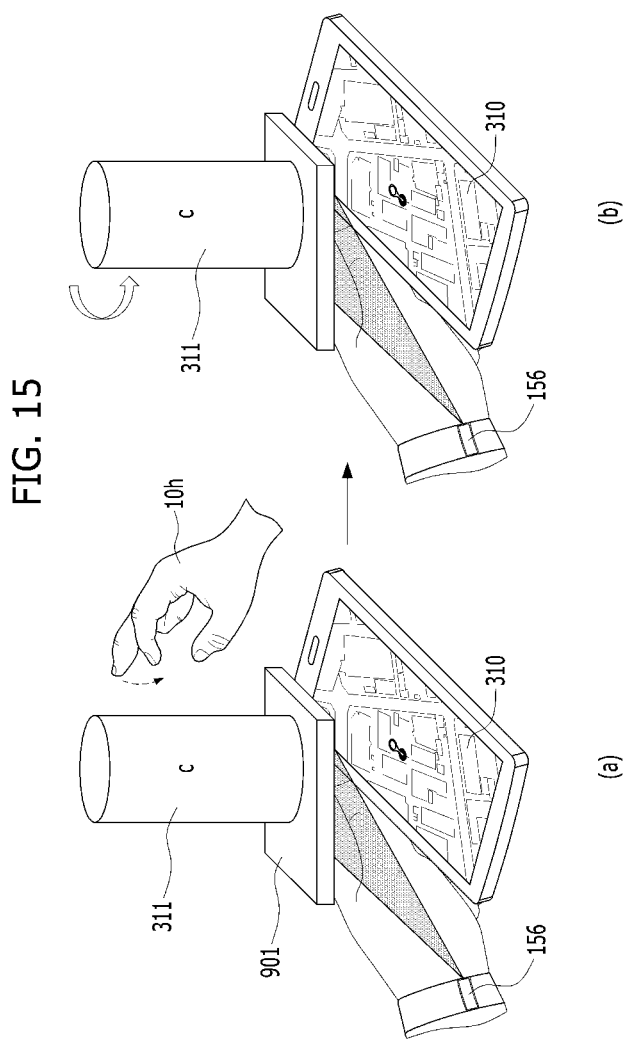
FIG. 15 is a diagram of a controlling method for rotating a holographic image 311 according to one embodiment of the present invention.

Hereinafter, additional methods for controlling the holographic image 311 are described with reference to FIGS. 15 and 16. In particular, FIG. 15 is a diagram of a controlling method for rotating a holographic image 311 according to one embodiment of the present invention. Referring to FIG. 15 (*a*), the holography module 156 outputs the holographic image 311. The holographic image 311 can be the image corresponding to the application launch screen 310 as mentioned in the foregoing description and outputs the sub-board 901 mentioned with reference to FIGS. 12 to 14.

According to the embodiment of the present invention described with reference to FIG. 15, a gesture of holding and rotating the sub-board 901 or a gesture 10*h* of shaking the finger is provided as a gesture of rotating the holographic image 311. In case of the gesture of shaking the finger, if the index finger is shaken, the holographic image 311 can be controlled to be rotated in a counterclockwise direction. Alternatively, if the thumb is shaken, the holographic image 311 can be controlled to be rotated in a clockwise direction (FIG. 15 (*b*)).

Figure 16:
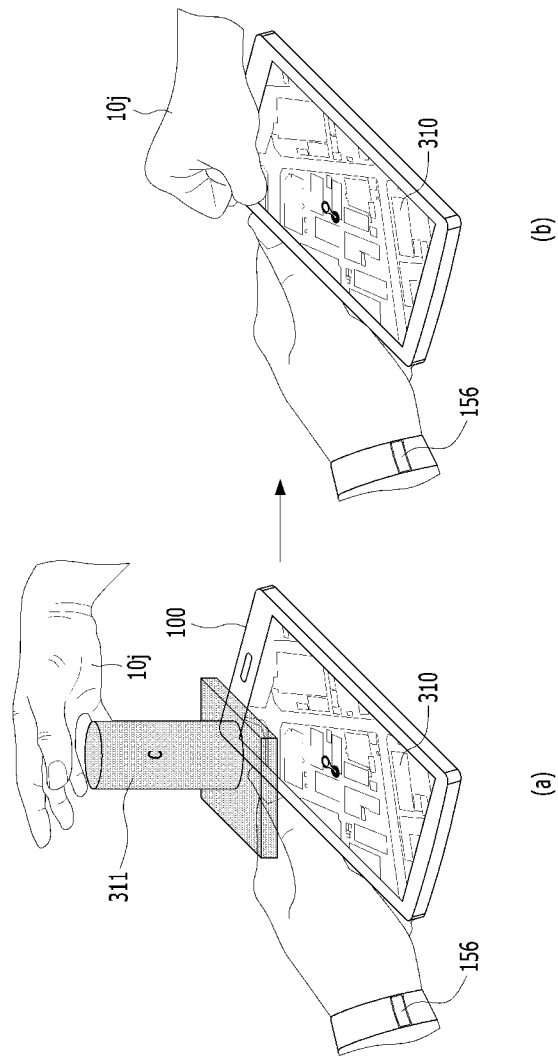
FIG. 16 is a diagram to describe a gesture for eliminating a holographic image.

A gesture of eliminating the holographic image 311 is described with reference to FIG. 16. In particular, FIG. 16 is a diagram to describe a gesture for eliminating a holographic image. Referring to FIG. 16, the holography module 156 outputs the holographic image 311. The holographic image may be the image corresponding to the application launch screen 310 as mentioned in the foregoing description. If receiving a gesture 10*j* of opening and closing the hand at a location to which the holographic image 311 is output, the controller 180 can control the output of the holographic image 311 to be eliminated as shown in FIGS. 16 (*a*) and (*b*).

Hereinafter, a controlling method for selecting a specific object from the holographic image and enlarging the specific object is described with reference to FIG. 17. In particular, FIG. 17 is a diagram of a controlling method for selecting a specific object from a holographic image and enlarging only the specific object.

Figure 17:
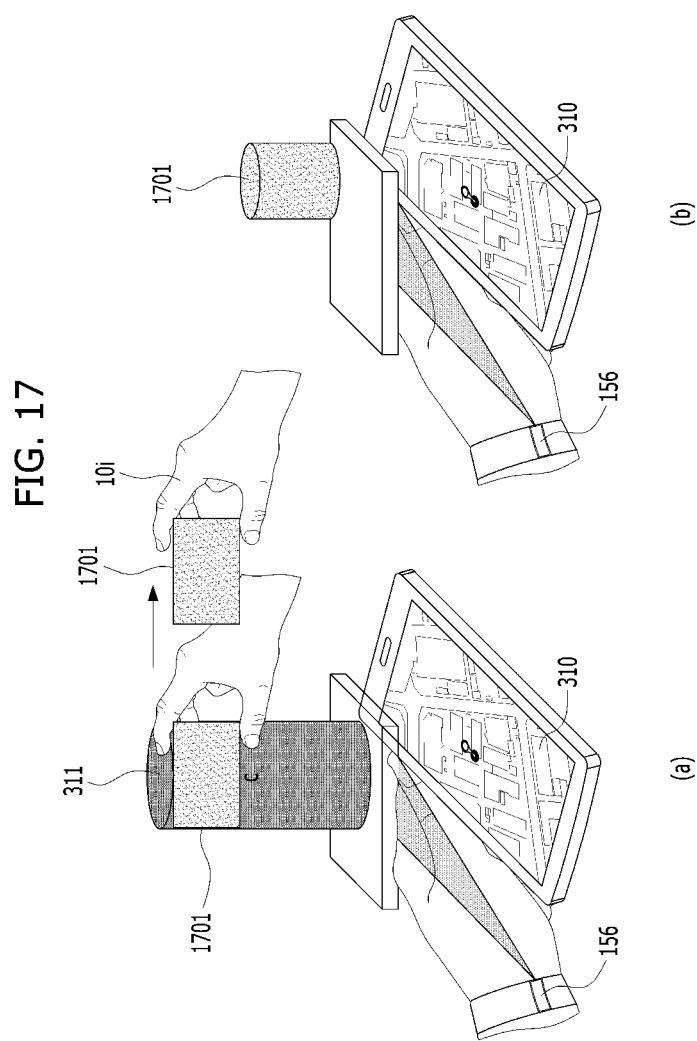
FIG. 17 is a diagram of a controlling method for selecting a specific object from a holographic image and enlarging the specific object only.

Referring to FIG. 17 (*a*), the holography module 156 outputs the holographic image 311. The holographic image 311 can be the image corresponding to the application launch screen 310 as mentioned in the foregoing description. And, the holographic image 311 includes the specific object.

If the holographic image 311 corresponds to a building, a specific part of the building may be selected and then enlarged. Alternatively, if the holographic image 311 corresponds to a structure of a human body, a specific organ may be selected and then enlarged. Thus, the controlling method for selecting the specific object from the holographic image 311 and enlarging the specific object only is proposed in an embodiment of the present invention.

Referring to FIG. 17 (*a*), if a gesture 10*i* of pinching a specific object 1701 with two fingers and then bring the specific object 1701 out is sensed, the holography module 156 can enlarge the specific object 1701 and then output the enlarged specific object 1701 (FIG. 17 (*b*)). Meanwhile, various types of gestures may be used in order to control a holographic image. In the following description, examples of such gestures will be explained with reference to FIG. 18. It is apparent that the following gestures are used for controlling the project module 155 as well as the holography module 156.

Figure 18:
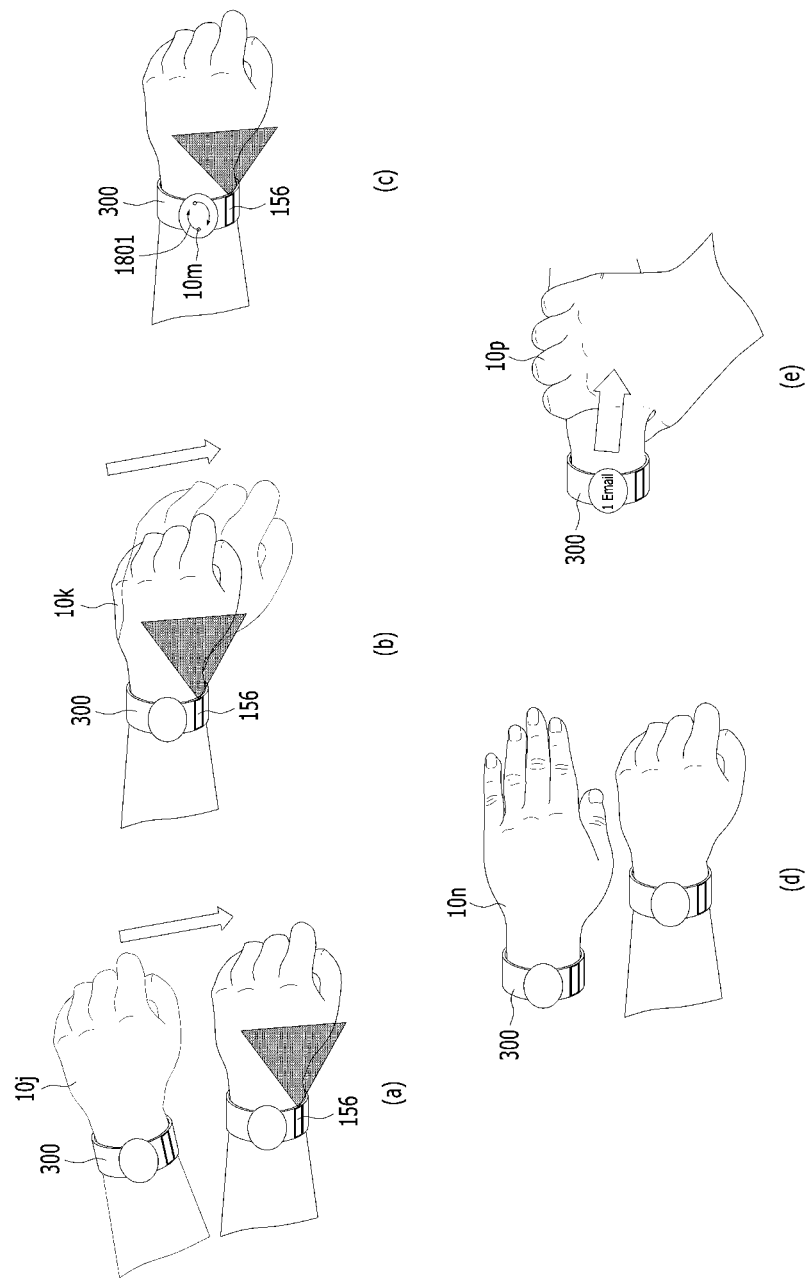
FIGS. 18 to 20 are diagrams of examples of available gestures in one embodiment of the present invention.
Figure 19:
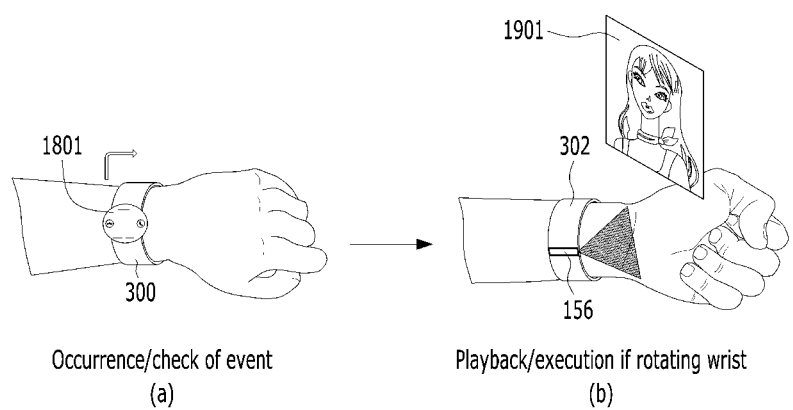
Figure 20:
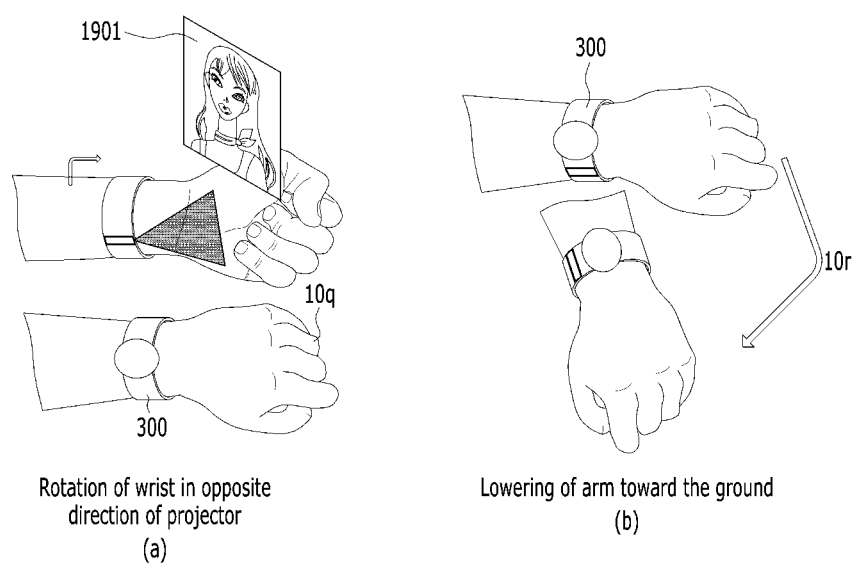

FIGS. 18 to 20 are diagrams of examples of available gestures in one embodiment of the present invention. FIG. 18 (*a*) shows a gesture 10*j* that a user moves down the hand on which the watch type mobile terminal 300 is worn. As mentioned in the foregoing description with reference to FIG. 9, if the gesture 10*j* is sensed while the holographic image 311 is output, the holography module 156 can change the size of the holographic image 311 from the first size into the second size and then output the second size of the holographic image 311.

FIG. 18 (*b*) shows a gesture 10*k* that a user bends down the wrist of the hand on which the watch type mobile terminal 300 is worn. In FIG. 18 (*c*), if a screen of the watch type mobile terminal 300 corresponds to a touchscreen 1801, a touch gesture 10*m* of rotating the touchscreen 1801 in a clockwise/counterclockwise direction is illustrated.

FIG. 18 (*d*) shows a gesture 10*n* of opening and closing the hand. FIG. 18 (*e*) shows a gesture 10*p* of sweeping down the wrist on which the watch type mobile terminal 300 is worn. Details of functions, which may be executed in response to such the gesture, will be described with reference to FIGS. 21 and 22. The gestures described with reference to FIG. 18, which are just exemplary, may be used to control the project module 155 or the holography module 156.

FIG. 19 is a diagram illustrating an example of a gesture of rotating a wrist according to one embodiment of the present invention. Referring to FIG. 19 (*a*), the watch type mobile terminal 300 receives a call signal and outputs a notification screen for the received call signal through the touchscreen 1801. In response to reception of the call signal, if a gesture of rotating the wrist is sensed, the holography module 156 or the projector module 155 grants the received call signal and may then output an image 1901 for the connected call.

In contrast to FIG. 19, a gesture for ending the call is shown in FIG. 20 (*a*). In a situation that the image 1901 for the connected call is output as shown in FIG. 19 (*b*), if a gesture 10*q* of rotating the wrist in the opposite direction is received, the controller 180 can end the call and then stop the output of the image 1901.

Referring to FIG. 20 (*b*), while the image 1901 for the call is output, if a gesture 10*r* of lowering the hand on which the watch type mobile terminal 300 is worn toward the ground is received, the controller 180 can end the call and then stop the output of the image 1901.

Figure 21:
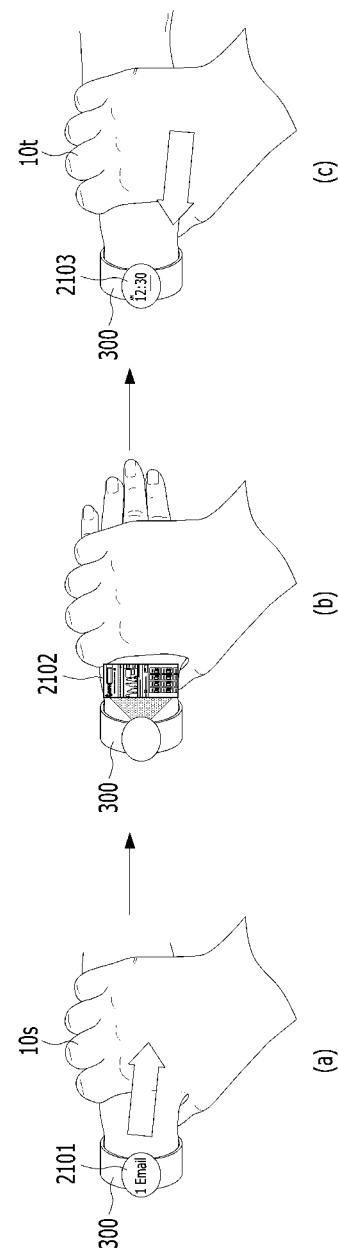
FIGS. 21 and 22 are diagrams of a controlling method for controlling a mobile terminal based on a gesture of sweeping a wrist up or down according to one embodiment of the present invention.
Figure 22:
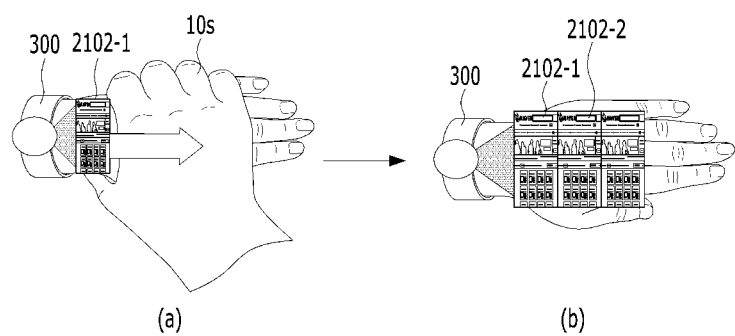

FIGS. 21 and 22 are diagrams of a controlling method for controlling a mobile terminal based on a gesture of sweeping a wrist up or down according to one embodiment of the present invention. Referring to FIG. 21 (*a*), a user wears the watch type mobile terminal 300 and a notification screen 2101 for e-mail received through the watch type mobile terminal 300 is output.

If a gesture 10*s* of sweeping the wrist down is received, the controller 180 can control the projector module 155 or the holography module 156 to output a screen 2102 for the received e-mail. Particularly, in the example shown in FIG. 21 (*b*), the projector module 155 is disposed at the side of the watch type mobile terminal 300 and projects the screen 2102 in the direction of the user's wrist. Therefore, the user can check the output screen 2102 for the email at the user's wrist in response to the gesture 10*s* of sweeping the wrist down.

While the screen 2102 is output, if a gesture 10*t* of sweeping the wrist up is received, the controller 180 can stop the output of the screen 2102. And, the controller 180 can further switch it into a watch screen 2103 (FIG. 21 (*c*)). Meanwhile, output of a single screen is described with reference to FIG. 21, by which the present invention is non-limited. Hereinafter, output of multiple screens will be described with reference to FIG. 22.

Referring to FIG. 22 (*a*), the controller 180 can control the projector module 155 or the holography module 156 to output a first screen 2102-1 for the received e-mail. If a plurality of e-mails are received, a screen for each of a plurality of the received e-mails may be output.

The controller 180 can control the number of output screens 2102 in proportion to a length of the gesture 10s that sweeps the wrist down. If receiving a first length of the gesture 10s, the controller 180 outputs the first screen 2102-1 only. However, if continuously receiving a second length of the gesture 10s, the controller can control the projector module 155 or the holography module 156 to further output second and third screens 2102-2 (FIG. 22 (b)).

FIG. 23 is a flowchart of a controlling method for outputting a holographic image according to one embodiment of the present invention. First of all, the mobile terminal and the watch type mobile terminal 300 are interconnected with each other (S2301). In this instance, the interconnection means that a state capable of exchanging data between the mobile terminal 100 and the watch type mobile terminal 300 is maintained. In particular, the mobile terminal 100 may transmit a control command to the watch type mobile terminal 300 and vice versa.

The controller 180 can control the display unit 151 to output a launch screen of a predetermined application through a screen of the mobile terminal 100 (S2302). The controller 180 can sense a gesture of a user (S2303). For instance, the controller 180 of the mobile terminal 100 may sense the user's gesture based on at least one of information, which is included in data received from the watch type mobile terminal 300, on movement of the watch type mobile terminal 300 and information, which is obtained through the sensing unit 140 of the mobile terminal 100, on movement of the mobile terminal 100.

The controller 180 can recognize whether a preset gesture is sensed (S2304). For example, the preset gesture may be a gesture of tilting the front surface of the touchscreen of the mobile terminal 100 to face to the sky. In another example, the present gesture may be a gesture that the user keeps the mobile terminal 100 horizontal with the ground while touching the touchscreen of the mobile terminal 100.

In another example, the preset gesture may be a gesture that the user rotates an edge region of the watch type mobile terminal 300 in a clockwise (or counterclockwise) direction while touching the touchscreen of the mobile terminal 100. In another example, the preset gesture may be a gesture that the user tilts the mobile terminal 100 while touching the touchscreen of the mobile terminal 100.

If the preset gesture is not sensed (S2304, No), the controller 180 can sense a gesture of the user. In particular, the controller 180 can continuously sense whether the present gesture is sensed in real time. Meanwhile, If the present gesture is sensed (S2304, Yes), the controller 180 can output a holographic image corresponding to the launch screen through the interconnected watch type mobile terminal 300 (S2305). In this instance, the holography module 156 disposed at a band of the watch type mobile terminal 300 may output the holographic image through an empty space over the front surface of the screen of the mobile terminal 100 (S2306).

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a touchscreen;
a wireless communication circuit configured to wirelessly communicate with an external watch terminal having a holography circuit disposed in a band of the watch terminal and being worn by a user;
a sensing unit configured to sense a gesture of the user; and
a controller configured to:
display a launch screen of a prescribed application on the touchscreen,
receive a prescribed gesture sensed through the sensing circuit, and
control the wireless communication circuit to transmit a control command to the external terminal to output a holographic image corresponding to the launch screen, in response to the received prescribed gesture.

2. The mobile terminal of claim 1, wherein the prescribed gesture comprises a gesture of tilting a front surface of the touchscreen to face upwards.

3. The mobile terminal of claim 1, wherein the holography circuit included in the band of the external terminal is configured to face a front surface of the touchscreen of the mobile terminal.

4. The mobile terminal of claim 1, wherein the sensing circuit is further configured to sense an air gesture received in an empty space over the front surface of the touchscreen, and
wherein the controller is further configured to transmit the control command to the external watch terminal for rotating the holographic image or adjusting a size of the holographic image based on the sensed air gesture.

5. The mobile terminal of claim 4, wherein the sensing circuit comprises a camera circuit, and
wherein the sensing circuit is further configured to sense the air gesture by analyzing an image received through the camera circuit.

6. The mobile terminal of claim 5, wherein the sensing circuit further comprises a proximity sensor for sensing an approach of a hand of the user, and
wherein the controller is further configured to activate the camera circuit in response to the proximity sensor senses the approach of the hand.

7. The mobile terminal of claim 4, wherein the controller is further configured to sense a touch to two points on the touchscreen, and
wherein if the sensing circuit senses a gesture of releasing the touch and lifting in the air, the controller is further configured to transmit the control command to the external terminal to further output a sub-board corresponding to a holographic object for controlling the output holographic image.

8. The mobile terminal of claim 7, wherein if the sensing circuit senses a gesture of picking up and turning over the output sub-board, the controller is further configured to transmit the control command to further output detailed information on the holographic image.

9. The mobile terminal of claim 8, wherein the holographic image comprises an image of a prescribed building, and
wherein the detailed information comprises information on each floor of the prescribed building.

10. The mobile terminal of claim 1, wherein the holographic image includes a 3D image of at least a portion of the launch screen displayed on the touchscreen, and
wherein the holographic image is changeable based on touch inputs received on the touchscreen.

11. A method of controlling a mobile terminal, the method comprising:
wirelessly communicating, via a wireless communication circuit, with an external watch terminal having a holography circuit disposed in a band on the watch terminal and being worn by a user;
displaying a launch screen of a prescribed application on a touchscreen of the mobile terminal;
sensing, via a sensing circuit, a gesture of the user; and
transmitting, via the wireless communication circuit, a control command to the external terminal to output a holographic image corresponding to the launch screen, in response to the received prescribed gesture.

12. The method of claim 11, wherein the prescribed gesture comprises a gesture of tilting a front surface of the touchscreen to face upwards.

13. The method of claim 11, wherein the holography circuit included in the band of the external terminal is configured to face a front surface of the touchscreen of the mobile terminal.

14. The method of claim 11, further comprising:
sensing, via the sensing circuit, an air gesture received in an empty space over the front surface of the touchscreen; and
transmitting, via the wireless communication circuit, the control command to the external watch terminal for rotating the holographic image or adjusting a size of the holographic image based on the sensed air gesture.

15. The method of claim 14, further comprising:
sensing, via a camera circuit of the mobile terminal, the air gesture by analyzing an image received through the camera circuit.

16. The method of claim 15, further comprising:
sensing, via a proximity sensor of the mobile terminal, an approach of a hand of the user; and
activating, via the controller, the camera circuit in response to the proximity sensor sensing the approach of the hand.

17. The method of claim 14, further comprising:
sensing a touch to two points on the touchscreen; and
if the sensing senses a gesture of releasing the touch and lifting in the air, transmitting the control command to the external terminal to further output a sub-board corresponding to a holographic object for controlling the holographic image.

18. The method of claim 17, further comprising:
if the sensing circuit senses a gesture of picking up and turning over the output sub-board, transmitting the control command to further output detailed information on the holographic image.

19. The method of claim 18, wherein the holographic image comprises an image of a prescribed building, and
wherein the detailed information comprises information on each floor of the prescribed building.

20. The method of claim 11, wherein the holographic image includes a 3D image of at least a portion of the launch screen displayed on the touchscreen, and
wherein the holographic image is changeable based on touch inputs received on the touchscreen.

* * * * *